(12) United States Patent
Zhou et al.

(10) Patent No.: US 11,115,607 B2
(45) Date of Patent: Sep. 7, 2021

(54) CONTROL SYSTEM FOR STRUCTURED LIGHT PROJECTOR AND ELECTRONIC DEVICE

(71) Applicant: GUANGDONG OPPO MOBILE TELECOMMUNICATIONS CORP., LTD., Guangdong (CN)

(72) Inventors: Haitao Zhou, Dongguan (CN); Kamwing Au, Dongguan (CN); Ziqing Guo, Dongguan (CN); Fangfang Hui, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 105 days.

(21) Appl. No.: 16/518,179

(22) Filed: Jul. 22, 2019

(65) Prior Publication Data
US 2020/0036912 A1 Jan. 30, 2020

(30) Foreign Application Priority Data

Jul. 27, 2018 (CN) .......................... 201810840262.7
Jul. 27, 2018 (CN) .......................... 201810840347.5

(51) Int. Cl.
| | |
|---|---|
| H04N 5/33 | (2006.01) |
| G03B 21/20 | (2006.01) |
| G01B 11/25 | (2006.01) |
| G06K 9/20 | (2006.01) |
| G06K 9/00 | (2006.01) |

(52) U.S. Cl.
CPC .............. *H04N 5/33* (2013.01); *G01B 11/25* (2013.01); *G03B 21/2033* (2013.01); *G06K 9/00255* (2013.01); *G06K 9/2018* (2013.01)

(58) Field of Classification Search
CPC ............... G01B 11/25; G03B 21/2033; G06K 9/00255; G06K 9/2018; H04N 5/33
See application file for complete search history.

(56) References Cited

U.S. PATENT DOCUMENTS

| | | |
|---|---|---|
| 6,661,820 B1 | 12/2003 | Camilleri |
| 8,462,199 B2 | 6/2013 | Givon |
| 8,878,896 B2 | 11/2014 | Givon |
| 9,131,220 B2 | 9/2015 | Givon |

(Continued)

FOREIGN PATENT DOCUMENTS

| | | |
|---|---|---|
| CN | 101310515 A | 11/2008 |
| CN | 101762243 A | 6/2010 |

(Continued)

OTHER PUBLICATIONS

International Search Report in the international application No. PCT/CN2019/075381, dated Apr. 28, 2019.

(Continued)

*Primary Examiner* — Mark R Gaworecki
(74) *Attorney, Agent, or Firm* — Ladas & Parry, LLP

(57) ABSTRACT

A control system (100) for a structured light projector (200) and an electronic device (1000) are provided. The control system (100) includes a first driving circuit (10) and an application processor (40). The first driving circuit (10) is connected with the structured light projector (200), and is configured to drive the structured light projector (200) to project laser. The application processor (40) is configured to control the first driving circuit (10) to be switched on and switched off based on a detection signal.

20 Claims, 10 Drawing Sheets

(56) References Cited

U.S. PATENT DOCUMENTS

| | | |
|---|---|---|
| 2006/0291510 A1 | 12/2006 | Juluri |
| 2007/0285554 A1 | 12/2007 | Givon |
| 2008/0123708 A1 | 5/2008 | Benner |
| 2010/0194862 A1 | 8/2010 | Givon |
| 2011/0080496 A1 | 4/2011 | Givon |
| 2013/0188024 A1 | 7/2013 | Givon |
| 2015/0062542 A1 | 3/2015 | Appia |
| 2015/0260830 A1 | 9/2015 | Ghosh et al. |
| 2015/0281671 A1 | 10/2015 | Bloom |
| 2016/0381330 A1 | 12/2016 | Wu |
| 2017/0365102 A1 | 12/2017 | Huston |
| 2018/0063390 A1 | 3/2018 | Trail |

FOREIGN PATENT DOCUMENTS

| | | |
|---|---|---|
| CN | 102385237 A | 3/2012 |
| CN | 102706290 A | 10/2012 |
| CN | 102833487 A | 12/2012 |
| CN | 106060525 A | 10/2016 |
| CN | 106534633 A | 3/2017 |
| CN | 106560743 A | 4/2017 |
| CN | 106574761 A | 4/2017 |
| CN | 106840121 A | 6/2017 |
| CN | 107122032 A | 9/2017 |
| CN | 107209008 A | 9/2017 |
| CN | 107424187 A | 12/2017 |
| CN | 107443429 A | 12/2017 |
| CN | 107800962 A | 3/2018 |
| CN | 107820005 A | 3/2018 |
| CN | 108027441 A | 5/2018 |
| CN | 108139207 A | 6/2018 |
| CN | 108196418 A | 6/2018 |
| CN | 108303835 A | 7/2018 |
| CN | 108322729 A | 7/2018 |
| CN | 109005370 A | 12/2018 |
| CN | 109005371 A | 12/2018 |
| JP | 2002236318 A | 8/2002 |
| JP | 2008224618 A | 9/2008 |
| JP | 2009210912 A | 9/2009 |
| WO | 2018012945 A1 | 1/2018 |

OTHER PUBLICATIONS

Written Opinion of the International Search Authority in the international application No. PCT/CN2019/075381, dated Apr. 28, 2019.
First Office Action of the Taiwanese application No. 108119015, dated Feb. 5, 2020.
Supplementary European Search Report in the European application No. 19178360.4, dated Mar. 19, 2020.
Notice of Allowance of the Chinese application No. 201810840262.7, dated Apr. 1, 2020.
Notice of Allowance of the Chinese application No. 201810840347.5, dated Mar. 2, 2020.
First Office Action and search report of the Chinese application No. 201810840262.7, dated Oct. 11, 2019.
First Office Action and search report of the Chinese application No. 201810840347.5, dated Oct. 11, 2019.
Partial Supplementary European Search Report in the European application No. 19178360.4, dated Dec. 2, 2019.
Office Action of the Indian application No. 201914030293, dated Mar. 5, 2021.

CONTROL SYSTEM FOR STRUCTURED LIGHT PROJECTOR AND ELECTRONIC DEVICE

CROSS-REFERENCE TO RELATED APPLICATIONS

The present application claims priority and rights to Patent Application No. CN 201810840262.7 and Patent Application No. CN 201810840347.5, filed to the State Intellectual Property Office of P.R.China on Jul. 27, 2018, the contents of which are hereby incorporated by reference in their entireties.

BACKGROUND

A structured light depth camera usually includes a structured light projector and an infrared camera. The structured light projector projects a diffracted laser pattern into a target space. The infrared camera shoots the laser pattern modulated by an object in the target space. A microprocessor obtains depth information of the object in the target space based on the laser pattern and a reference pattern. When the structured light projector works, the microprocessor provides a pulse signal, and an application processor provides an enabling signal. When a software flow works abnormally at a device such as a microprocessor, the structured light projector may not be successfully turned on or turned off. However, there is no solution for monitoring a working state of a structured light projector at present.

SUMMARY

The application relates to the technical field of consumer electronics, and particularly to a control system for a structured light projector and an electronic device.

Implementation modes of the application provide a control system for a structured light projector, and an electronic device.

The control system for a structured light projector in the implementation modes of the application may include a first driving circuit and an application processor. The first driving circuit may be connected with the structured light projector, and may be configured to drive the structured light projector to project laser. The application processor may be configured to control the first driving circuit to be switched on and switched off based on a detection signal.

The electronic device of the implementation modes of the application may include a structured light projector and a control system for the structured light projector. The control system for the structured light projector may include a first driving circuit and an application processor. The first driving circuit may be connected with the structured light projector, and may be configured to drive the structured light projector to project laser. The application processor may be configured to control the first driving circuit to be switched on and switched off based on a detection signal.

Additional aspects and advantages of the implementation modes of the application will be partially presented in the following descriptions and partially become apparent from the following descriptions or get understood by implementing the application.

BRIEF DESCRIPTION OF DRAWINGS

The abovementioned and/or additional aspects and advantages of the application may become apparent and easy to be understood from the descriptions made to the implementation modes below in combination with the drawings.

DETAILED DESCRIPTION

Figure 1:
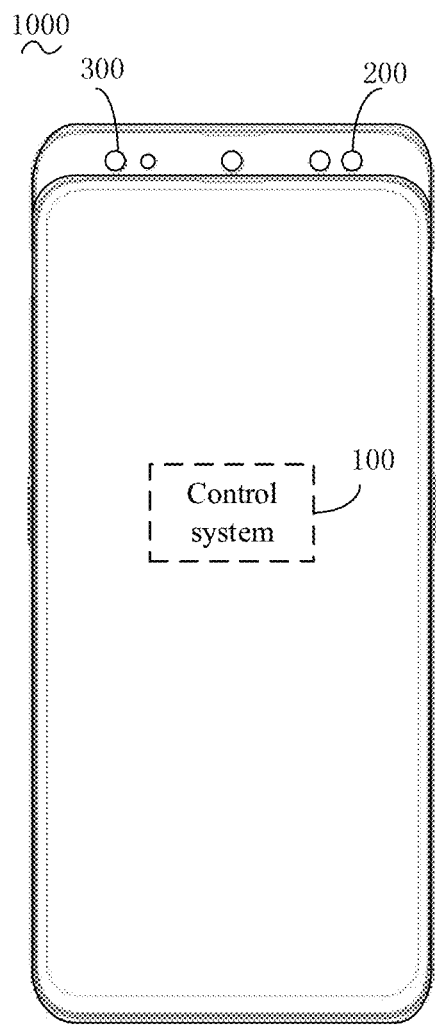
FIG. 1 is a structure diagram of an electronic device according to some implementation modes of the application.

The embodiments of the application will be described below in detail. Examples of the embodiments are illustrated in the drawings and the same or similar reference signs always represent the same or similar components or components with the same or similar functions. The embodiments described below with reference to the drawings are exemplary and intended to explain the application and should not be understood as limits to the application.

Figure 2:
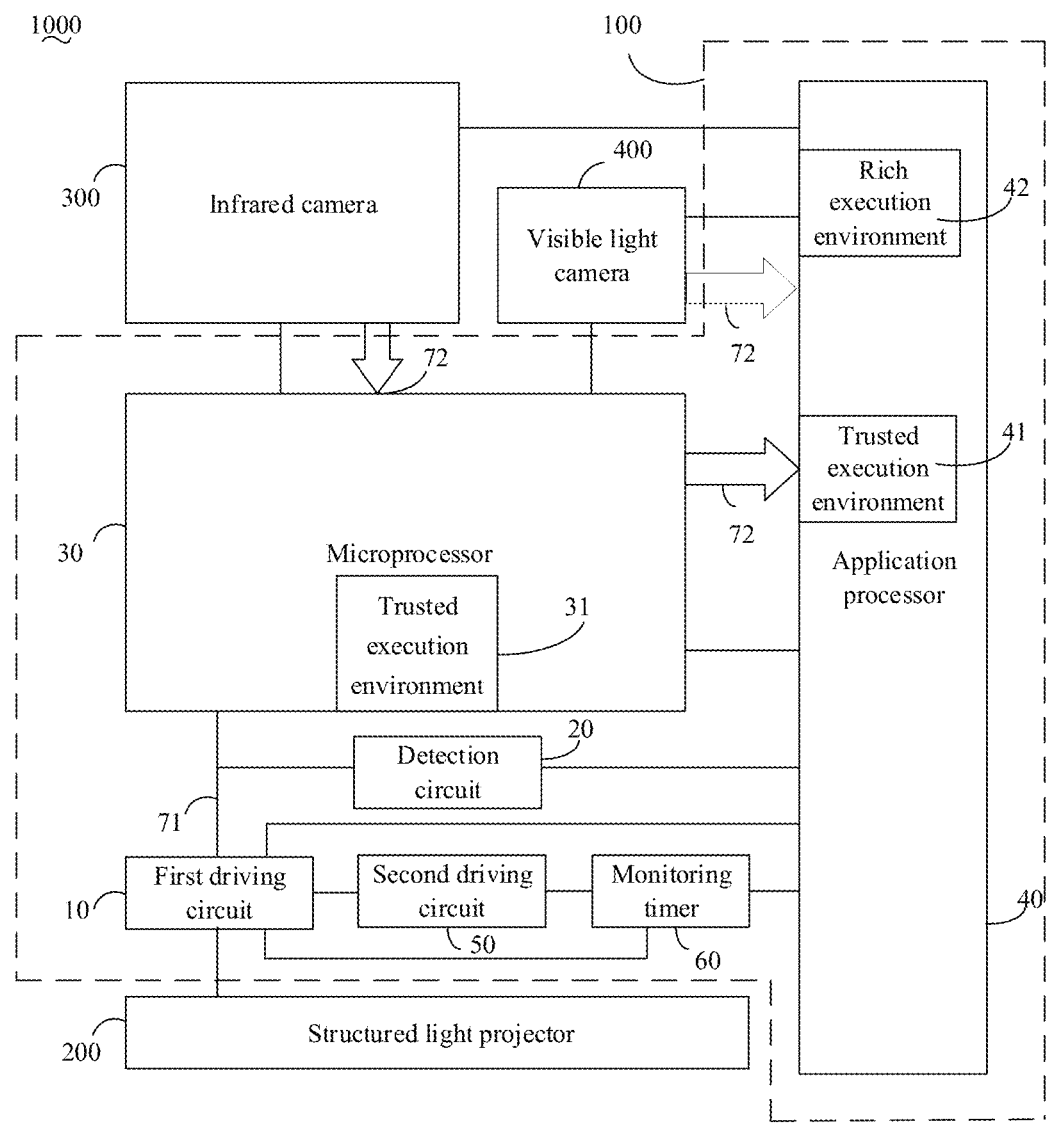
FIG. 2 is a module schematic diagram of an electronic device according to some implementation modes of the application.
Figure 8:
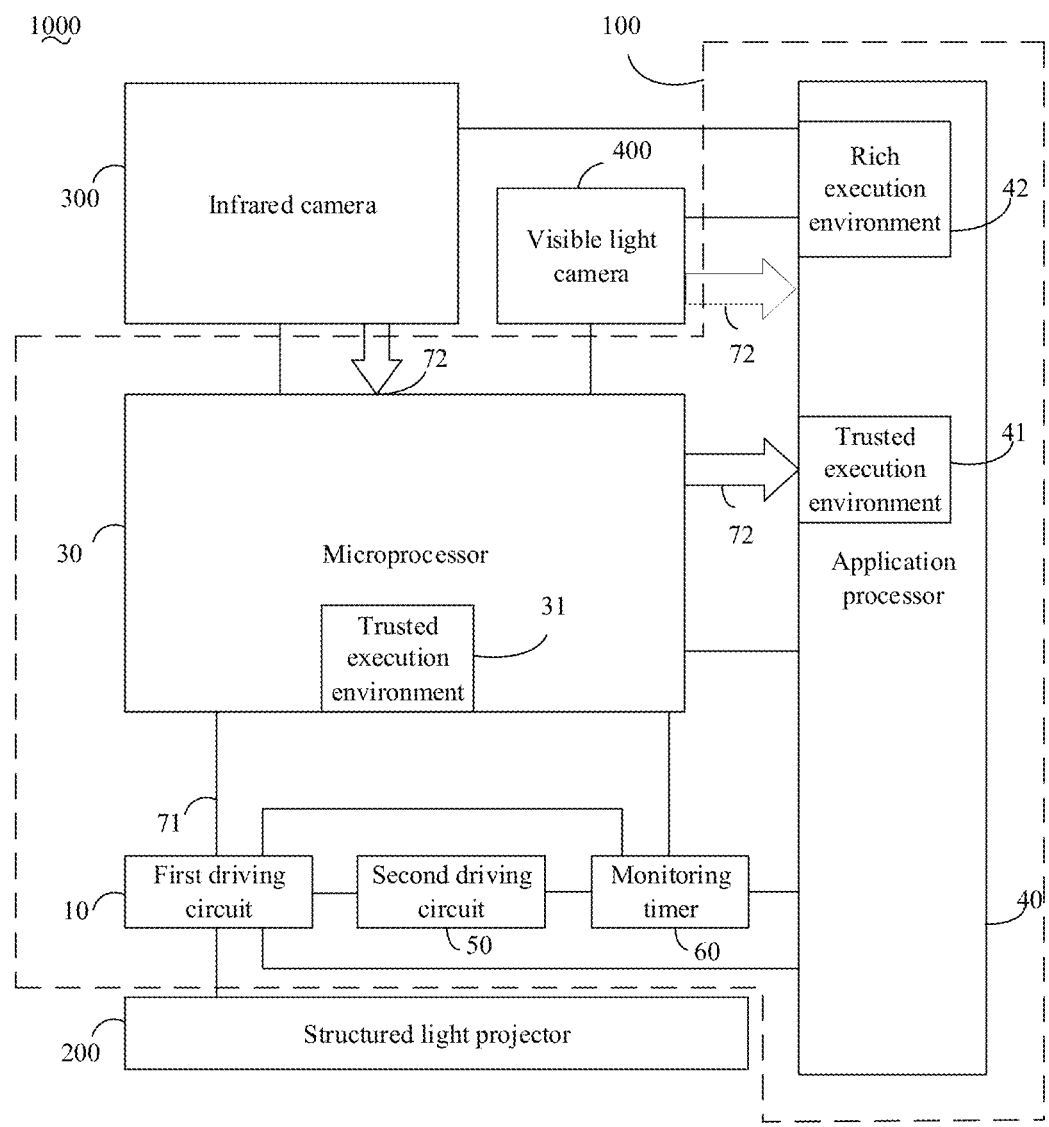
FIG. 8 is a module schematic diagram of an electronic device according to some implementation modes of the disclosure.

Referring to FIG. 1, FIG. 2 and FIG. 8, an electronic device 1000 according to the implementation modes of the application may include a structured light projector 200, an infrared camera 300 and a control system 100. The electronic device 1000 may be a mobile phone, a tablet computer, a notebook computer, a wearable device (for example, a smart watch, a smart band, intelligent glasses and an intelligent helmet) and the like. Descriptions are made in embodiments of the application with the case that the electronic device 1000 is a mobile phone as an example. It can be understood that the electronic device 1000 is not limited to a mobile phone.

The structured light projector 200 may project laser to a target object, and the laser may be infrared light. In addition, the laser projected by the structured light projector 200 may be a pattern with characteristic speckles, stripes or the like. The infrared camera 300 may acquire an infrared image of the target object or receive a laser pattern modulated by the target object.

Referring to FIG. 2 and FIG. 8, the control system 100 may include a first driving circuit 10 and an application processor 40. The first driving circuit 10 may be connected with the structured light projector 200, and may be configured to drive the structured light projector 200 to project laser. The application processor 40 may be configured to control the first driving circuit 10 to be switched on and switched off based on a detection signal. The control system 100 may further include a microprocessor 30. The microprocessor 30 may be connected with both of the first driving circuit 10 and the application processor 40. The microprocessor 30 may be configured to send a driving signal to the first driving circuit 10 to enable the first driving circuit 10 to drive the structured light projector 200 to project laser.

According to the control system 100 and electronic device 1000 of the implementation modes of the application, whether the structured light projector 200 is successfully turned on or turned off may be judged based on a detection signal, and the first driving circuit 10 may be controlled to be switched on and switched off based on a judgment result, thereby avoiding the problem that the structured light projector 200 cannot be successfully turned on or turned off when a software flow works abnormally at the microprocessor 30 and ensuring safety in use of the electronic device 1000 by a user.

Still referring to FIG. 2 and FIG. 8, in some implementation modes, the infrared camera 300 of the electronic device 1000 may be connected with both of the microprocessor 30 and the application processor 40. The application processor 40 may provide an enabling signal for the infrared camera 300 to enable the infrared camera 300 to power on. The microprocessor 30 may provide a clock signal for the infrared camera 300 to enable the infrared camera 300 to acquire an infrared image or a laser image.

The microprocessor 30 may be connected with the first driving circuit 10 through a Pulse Width Modulation (PWM) interface 71 to provide a Pulse Width Modulation (PWM) signal (i.e., the driving signal) for the first driving circuit 10. The microprocessor 30 may be connected with the infrared camera 300 through a mobile industry processor interface 72 to receive the infrared image or laser image acquired by the infrared camera 300. The microprocessor 30 may be further connected with the application processor 40 through the mobile industry processor interface 72. A reference image is required for calculation of a depth image, and the reference image may be stored in a trusted execution environment 31 of the microprocessor 30 or a trusted execution environment 41 of the application processor 40. When the reference image is stored in the trusted execution environment 31 of the microprocessor 30, the microprocessor 30 may calculate the depth image in its own trusted execution environment 31 based on the laser image and the reference image, and transmit the depth image to the trusted execution environment 41 of the application processor 40 through the mobile industry processor interface 72 for storage. Or, the microprocessor 30 may send both of the reference image and the laser image to the trusted execution environment 41 of the application processor 40 through the mobile industry processor interface 72, and then the application processor 40 may calculate the depth image in its own trusted execution environment 41 based on the laser image and the reference image, and directly store the depth image in the trusted execution environment 41 of the application processor 40. When the reference image is stored in the trusted execution environment 41 of the application processor 40, the microprocessor 30 may send the laser image to the trusted execution environment 41 of the application processor 40 through the mobile industry processor interface 72, and the application processor 40 may calculate the depth image in its own trusted execution environment 41 based on the laser image and the reference image, and directly store the depth image in the trusted execution environment of the application processor 40.

Still referring to FIG. 2 and FIG. 8, in some implementation modes, the electronic device 1000 may further include a visible light camera 400. The visible light camera 400 may be connected with both of the microprocessor 30 and the application processor 40. The application processor 40 may provide an enabling signaling for the visible light camera 400 to enable the visible light camera 400 to power on. The application processor 40 may be further connected with the visible light camera 400 through the mobile industry processor interface 72 to receive a visible light image acquired by the visible light camera 400, and the visible light image may be stored in a rich execution environment 42 of the application processor 40. The application processor 40 may perform three-dimensional scenario modeling and the like based on the depth image and the visible light image.

In some implementation modes, the detection signal may be an output current or a data stream. When the detection signal is an output current, as shown in FIG. 2, the control system 100 may further include a detection circuit 20, and the detection circuit 20 may be connected with the first driving circuit 10 to detect the output current of the first driving circuit 10. When the detection signal is a data stream, as shown in FIG. 8, the data stream is a data stream sent by the infrared camera 300, and in such case, the microprocessor 30 may be connected with the infrared camera 300 to receive the data stream sent by the infrared camera 300.

Specifically, referring to FIG. 2, when the detection signal is an output current, the control system 100 may include the first driving circuit 10, the detection circuit 20, the microprocessor 30 and the application processor 40.

The first driving circuit 10 may be connected with the structured light projector 200. The first driving circuit 10 may be configured to drive the structured light projector 200 to project laser. Specifically, the first driving circuit 10 may be used as a current source of the structured light projector 200.

The microprocessor 30 may be connected with the first driving circuit 10. The microprocessor 30 may provide the driving signal for the first driving circuit 10. Specifically, the microprocessor 30 may provide the PWM signal for the first driving circuit 10, and the first driving circuit 10 may provide a driving current for the structured light projector 200 based on the PWM signal to enable the structured light projector 200 to project laser. The microprocessor 30 may regulate a duty ratio of the PWM signal to regulate a light emission duration of the structured light projector 200, and may regulate an amplitude of the PWM signal to regulate the light emission power of the structured light projector 200.

The detection circuit 20 may be connected with the first driving circuit 10, and the detection circuit 20 may be configured to detect the output current of the first driving circuit 10. When the detected current of the first driving circuit 10 is within a preset range (the preset range is usually a relatively small current range including zero, for example, 0.1 mA, 0.2 mA, 0.3 mA, 0.4 mA, 0.5 mA, 0.6 mA, 0.7 mA, 0.9 mA and 1 mA), it is indicated that the microprocessor 30 may not provide the PWM signal for the structured light projector 200, and in such case, the structured light projector 200 is in an off state. When the detected current of the first driving circuit 10 is out of the preset range, it is indicated that the microprocessor 30 provides the PWM signal for the structured light projector 200, and the structured light projector 200 is in an on state.

The application processor 40 may be connected with both of the microprocessor 30 and the first driving circuit 10. The application processor 40 may transmit instructions of controlling the structured light projector 200 to be turned on or turned off, controlling the infrared camera 300 to be turned on or turned off and the like to the microprocessor 30. The application processor 40 may further provide an enabling signal for the first driving circuit 10 to enable the first driving circuit 10 to power on. In a case that the structured light projector 200 is in an on state, the first driving circuit 10 is required to simultaneously meet the following two conditions: one is that the application processor 40 provides an enabling signal for the first driving circuit 10 to make the first driving circuit 10 powered on, and the other is that the microprocessor 30 provides the PWM signal for the first driving circuit to enable the first driving circuit 10 to provide a driving current for the structured light projector 200.

A software flow may work abnormally when the microprocessor 30 is working. Under this condition, the microprocessor 30 may be unable to provide the driving signal for the first driving circuit 10, and accordingly, the structured light projector 200 may be unable to be switched from the off state to the on state, namely the structured light projector 200 may not be successfully turned on. Or, the microprocessor 30 may keep providing the driving signal for the first driving circuit 10, and the structured light projector 200 may be unable to be switched from the on state to the off state, namely the structured light projector 200 cannot be successfully turned off.

The control system 100 of the implementation modes of the application may detect whether the structured light projector 200 is successfully turned on or not every time after the structured light projector 200 is turned on, or detect whether the structured light projector 200 is successfully turned off or not every time after the structured light projector 200 is turned off.

Specifically, the application processor 40 may be further connected with the detection circuit 20. The output current detected by the detection circuit 20 may be transmitted to the application processor 40, and the application processor 40 may control the first driving circuit 10 to be turned on and turned off based on the transmitted current.

Figure 3:
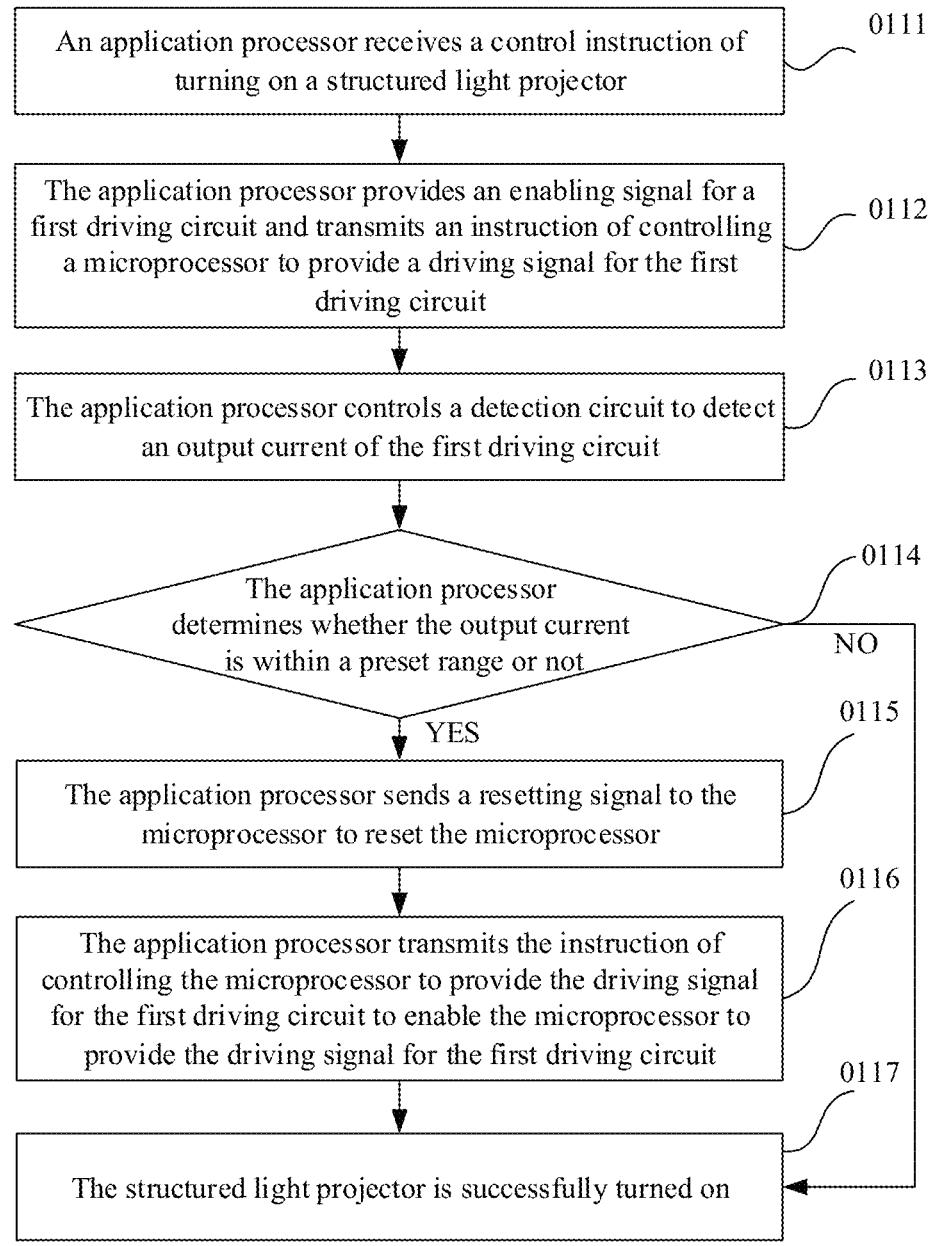
FIG. 3 to FIG. 7 are flowcharts of a control method for a structured light projector of the electronic device in FIG. 2.

Referring to FIG. 2 and FIG. 3, the application processor 40 may receive a control instruction of turning on the structured light projector 200. After the application processor 40 receives the control instruction of turning on the structured light projector 200, the application processor 40 may provide an enabling signal for the first driving circuit 10 and transmit an instruction of controlling the microprocessor 30 to provide the driving signal for the first driving circuit 10. After the application processor 40 completes providing the enabling signal and transmitting the instruction of controlling the microprocessor to provide the driving signal (which corresponds to an application scenario that a user is subjectively intended to turn on the structured light projector 200 but is not sure whether it is successfully turned on or not), the application processor 40 may control the detection circuit 20 to detect the output current of the first driving circuit 10. The detection circuit 20 may transmit the detected output current to the application processor 40, and the application processor 40 may determine a working state of the structured light projector 200. If the output current is within the preset range, it is indicated that the software flow works abnormally at the microprocessor 30. In such case, the application processor 40 may send a resetting signal to the microprocessor 30 to reset the microprocessor 30 to ensure that all software flows of the microprocessor 30 work in a normal running state, and then the application processor 40 may transmit the instruction of controlling the microprocessor 30 to provide the driving signal for the first driving circuit 10 to enable the microprocessor 30 to provide the driving signal for the first driving circuit 10, thereby successfully turning on the structured light projector 200. In a case that the output current is out of the preset range (that is, the output current is not within the preset range), it is indicated that the software flow works normally at the microprocessor 30, the microprocessor 30 may provide the driving signal for the first driving circuit 10 and the structured light projector 200 has been successfully turned on. In such case, the application processor 40 does not execute any operation, and the microprocessor 30 may keep a state of providing the driving signal for the first driving circuit 10.

Figure 4:
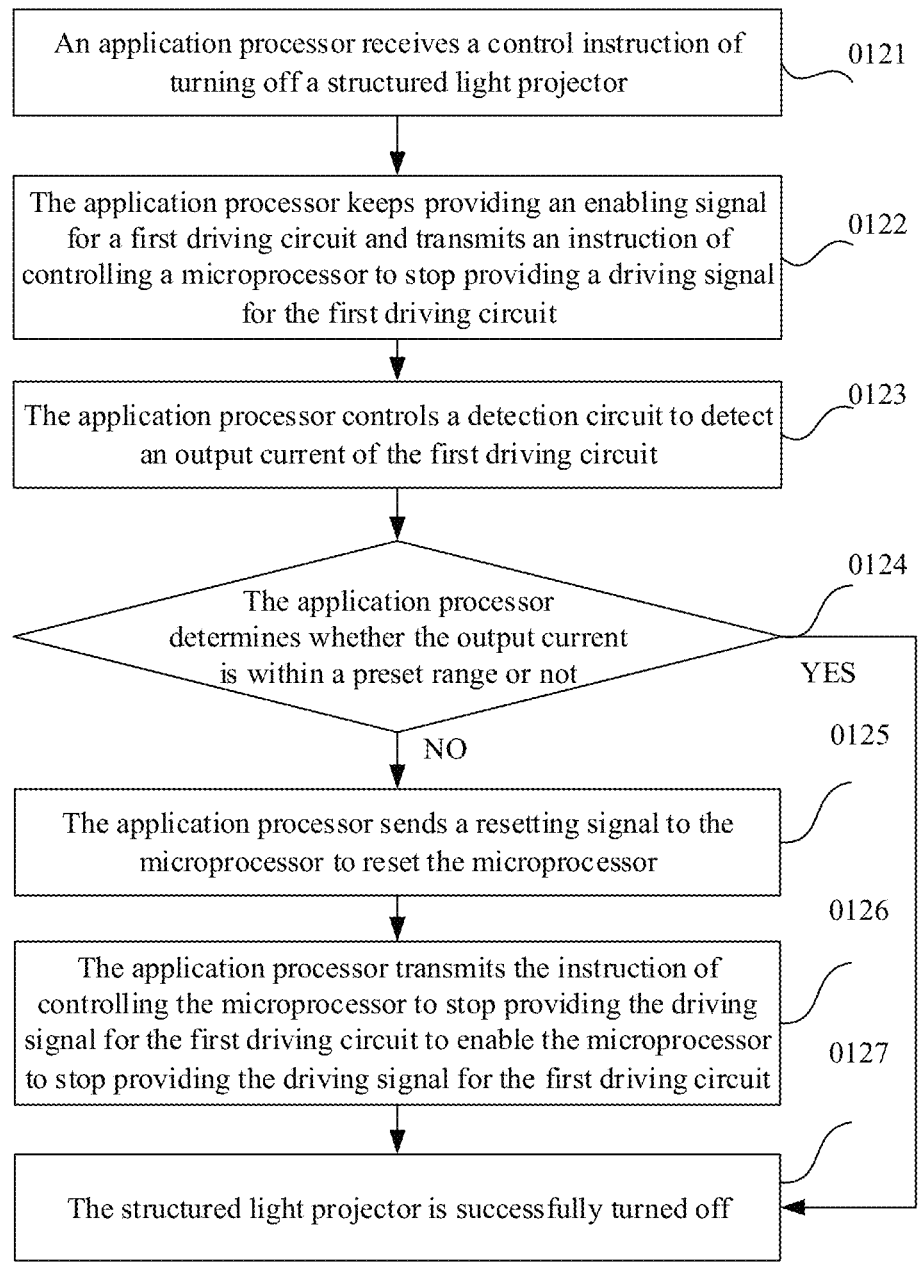

Referring to FIG. 2 and FIG. 4, the application processor 40 may further receive a control instruction of turning off the structured light projector 200. After the application processor 40 receives the control instruction of turning off the structured light projector 200, the application processor 40 may transmit an instruction of controlling the microprocessor 30 to stop providing the driving signal for the first driving circuit 10. After the application processor 40 completes transmitting the instruction (which corresponds to an application scenario that a user is subjectively intended to turn off the structured light projector 200 but is not sure whether it is successfully turned off or not), the application processor 40 may control the detection circuit 20 to detect the output current of the first driving circuit 10. The detection circuit 20 may transmit the detected output current to the application processor 40, and the application processor 40 may determine the working state of the structured light projector 200. In a case that the output current is within the preset range, it is indicated that no software flow works abnormally at the microprocessor 30, and that the microprocessor 30 has stopped providing the driving signal for the first driving circuit 10 and the structured light projector 200 is successfully turned off. In such case, the application processor 40 may not execute any operation, and the microprocessor 30 may keep a state of stopping providing the driving signal for the first driving circuit 10. In a case that the output current is out of the preset range (that is, the output current is not within the preset range), it is indicated that the software flow works abnormally at the microprocessor 30 and the structured light projector 200 is not successfully turned off. In such case, the application processor 40 may send a resetting signal to the microprocessor 30 to reset the microprocessor 30 to ensure that all software flows of the microprocessor 30 work in a normal running state, and then the application processor 40 may transmit an instruction of controlling the microprocessor 30 to stop providing the driving signal for the first driving circuit 10 to enable the microprocessor 30 to stop providing the driving signal for the first driving circuit 10, thereby successfully turning off the structured light projector 200.

Here, the application processor 40 may detect whether the structured light projector 200 is successfully turned on or not after the structured light projector 200 is turned on and detect whether the structured light projector 200 is successfully turned off or not after the structured light projector 200 is turned off. Or, the application processor 40 may detect whether the structured light projector 200 is successfully turned on or not only after the structured light projector 200 is turned on. Or, the application processor 40 may detect whether the structured light projector 200 is successfully turned off or not only after the structured light projector 200 is turned off.

It is to be noted that the application processor 40 may detect whether the structured light projector 200 is successfully turned on or not after the structured light projector 200 is turned on. Here, turning-on of the structured light projector 200 refers to a cognition of a user, that is, the user considers that the structured light projector 200 is turned on, but the structured light projector 200 is not successfully turned on in fact because of the abnormal software flow of the microprocessor 30. Similarly, the application processor 40 may detect whether the structured light projector 200 is successfully turned off or not after the structured light projector 200 is turned off. Here, turning-off of the structured light projector 200 also refers to a cognition of a user, that is, the user considers that the structured light projector 200 is turned off, but the structured light projector 200 is not successfully turned off in fact because of the abnormal software flow of the microprocessor 30.

From the above, according to the control system 100 of the implementation modes of the application, the detection circuit 20 may be adopted to detect the output current of the first driving circuit 10, and the application processor 40 may determine whether the structured light projector 200 is successfully turned on or turned off based on the output current and control the first driving circuit 10 to be turned on and turned off based on the output current, thereby avoiding the problem that a user experience is influenced by the fact that the structured light projector 200 is not successfully turned on or turned off because of the abnormal software flow at the microprocessor 30.

As described above, when the detection signal includes an output current, the structured light projector 200 may enter an off state as long as the application processor 40 does not provide an enabling signal for the first driving circuit 10 or the microprocessor 30 does not provide a driving signal for the first driving circuit 10. In the process that the application processor 40 detects whether the structured light projector 200 is successfully turned off or not, the application processor 40 may keep providing an enabling signal for the structured light projector 200 and determine whether the structured light projector 200 is successfully turned off or not based on whether the microprocessor 30 stops providing a driving signal for the first driving circuit 10 or not. The operation that the application processor 40 keeps providing an enabling signal for the structured light projector 200 in the whole detection process has the advantage that whether a software flow of the microprocessor 30 is in a normal state or not may be checked, the microprocessor 30 may be reset to ensure all of the software flows to be in a normal state if the software flow of the microprocessor 30 is not in a normal state, and thus there may be no such a problem that the structured light projector 200 cannot be successfully turned on because of the abnormal software flow when the structured light projector 200 is turned on next time. The application processor 40 may stop providing the enabling signal for the first driving circuit 10 after completing checking whether the structured light projector 200 is successfully turned off or not. Compared with the condition that the application processor 40 keeps providing the enabling signal for the first driving circuit 10 after completing checking turning-off of the structured light projector 200, energy consumption of the electronic device 1000 can be reduced by stopping providing the enabling signal for the first driving circuit 10 after the checking process.

Figure 5:
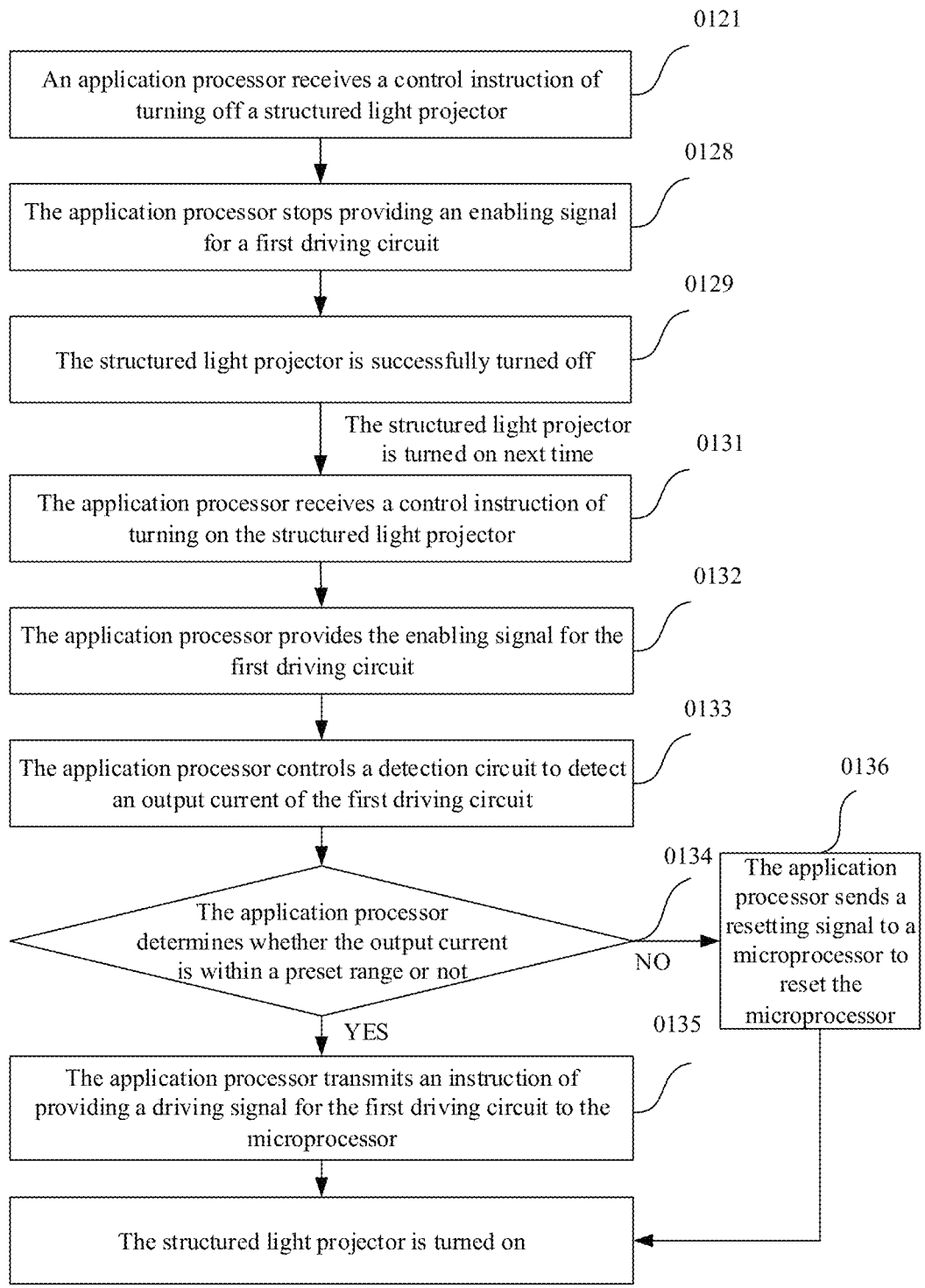

Please refer to both FIG. 2 and FIG. 5, when the detection signal is an output current, the application processor 40 may also directly stop providing the enabling signal for the first driving circuit 10 after receiving the control instruction of turning off the structured light projector 200. In such case, the structured light projector 200 may certainly be successfully turned off. However, there exists a problem that the application processor 40 cannot detect whether an abnormal software flow occurs to the microprocessor 30 or not. Then, before the structured light projector 200 is turned on next time, that is, when the application processor 40 receives the control instruction of turning on the structured light projector 200 next time, the application processor 40 may provide an enabling signal for the first driving circuit 10 at first. Then, the application processor 40 may control the detection circuit 20 to detect the output current of the first driving circuit 10. After the detection circuit 20 transmits the output current to the application processor 40, the application processor 40 may determine whether the structured light projector 200 has been turned on or not based on the output current. In a case that the output current is within the preset range, it is indicated that no abnormal software flow occurs to the microprocessor 30. That is, the application processor 40 has yet not transmitted the instruction of providing the driving signal for the first driving circuit 10 to the microprocessor 30 at this moment and nothing is wrong with the microprocessor 30. Then, the first driving circuit 10 cannot receive any driving signal and consequently cannot provide a driving current for the structured light projector 200, and the structured light projector 200 is not turned on. In such case, the application processor 40, after confirming that no software flow works abnormally at the microprocessor 30, may transmit the instruction of providing a driving signal for the first driving circuit 10 to the microprocessor 30 according to the turning-on control instruction, and the microprocessor 30, after receiving the instruction, may immediately provide a driving signal for the first driving circuit 10, thereby turning on the structured light projector 200. In a case that the output current is out of the preset range, it is indicated that the software flow works abnormally at the microprocessor 30. That is, the application processor 40 has yet not transmitted the instruction of providing a driving signal for the first driving circuit 10 to the microprocessor 30 at this moment. Then, the first driving circuit 10 cannot receive any driving signal. However, the first driving circuit 10 has received the driving signal provided by the microprocessor 30 in fact. It is indicated that the software flow works abnormally at the microprocessor 30 to keep providing the driving signal. The structured light projector 200 is in the off state just because the application processor 40 does not provide the enabling signal, but the structured light projector 200 can be turned on immediately as long as the application processor 40 provides the enabling signal again. In such case, the application processor 40, after confirming that the software flow works abnormally at the microprocessor 30, may send a resetting signal to the microprocessor 30 at first to reset the microprocessor 30 to ensure all of the software flows of the microprocessor 30 to work in a normal running state. Then, the application processor 40 may transmit the instruction of controlling the microprocessor 30 to provide the driving signal for the first driving circuit 10 to enable the microprocessor 30 to provide the driving signal for the first driving circuit 10. The structured light projector 200 may experience a process of turning on (turning-on caused by the abnormal software flow of the microprocessor 30), turning off (turning-off caused by resetting of the microprocessor 30) and re-turning on (turning-on caused by re-providing the driving signal for the first driving circuit 10 after the microprocessor 30 is reset). In the embodiment, before the structured light projector 200 is turned on, although the software works abnormally at the microprocessor 30 to keep providing the driving signal and the structured light projector 200 has been turned on after the application processor 40 powers the first driving circuit 10 on, the application processor 40 may be also required to reset the microprocessor 30 to recover a normal working state of the microprocessor 30. Although the structured light projector 200 may experience three states of turning on, turning off and re-turning on, resetting of the microprocessor 30 may ensure the normal work of the microprocessor 30.

Referring to FIG. 2, in some implementation modes, the control system 100 may further include a second driving circuit 50 and a monitoring timer 60. The second driving circuit 50 may be connected with the first driving circuit 10, and the second driving circuit 50 may supply power to the first driving circuit 10. The monitoring timer 60 may be connected with both of the first driving circuit 10 and the second driving circuit 50. The monitoring timer 60 may be further connected with the application processor 40 to receive a predetermined signal sent by the application processor 40. The monitoring timer 60 may be configured to, when a predetermined signal is not received within a predetermined duration, control the first driving circuit 10 and the second driving circuit 50 to be in an off state to further make the structured light projector 200 to be in an off state.

It can be understood that the first driving circuit 10 may right be in a state of keeping driving the structured light projector 200 to emit laser when a running failure occurs to the application processor 40, for example, the application processor 40 goes down, and the continuously emitted laser is dangerous and likely to harm eyes of a user. Therefore, it is required to monitor a running state of the application processor 40 and timely turn off the structured light projector 200 when the application processor 40 fails. In the embodiment of the application, the monitoring timer 60 may switch off the first driving circuit 10 and the second driving circuit 50 to turn off the structured light projector 200.

For monitoring the running state of the application processor 40, the application processor 40 may send the predetermined signal to the monitoring timer 60 within the predetermined duration, for example, sending a clearing signal to the monitoring timer 60 every 50 milliseconds. When the running failure occurs to the application processor 40, the application processor 40 may not run a program of sending the predetermined signal to the monitoring timer 60 and thus may not send the predetermined signal to monitor a failure state of the application processor 40.

The monitoring timer 60 may be connected with the first driving circuit 10 and the second driving circuit 50, the monitoring timer 60 may be connected with the application processor 40, and the monitoring timer 60, in a case of failing to receive the predetermined signal within the predetermined duration, switches off the first driving circuit 10 and the second driving circuit 50 to turn off the structured light projector 200. Therefore, even though one of the first driving circuit 10 and the second driving circuit 50 fails and thus cannot be directly switched off, the monitoring timer 60 may switch off the first driving circuit 10 and the second driving circuit 50 to ensure that at least the one which does not fail in the first driving circuit 10 and the second driving circuit 50 is switched off to smoothly turn off the structured light projector 200. Here, the predetermined duration may be set before delivery of the electronic device 1000, or may also be self-defined in the electronic device 1000 by a user.

The monitoring timer 60 may be a counter. After the monitoring timer 60 receives a predetermined signal, the monitoring timer 60 may start counting down at a certain rate from a number. If the application processor 40 works normally, before countdown to 0, the application processor 40 may send the predetermined signal again, and the monitoring timer 60, after receiving the predetermined signal, resets a countdown. If the application processor 40 does not work normally, when the monitoring timer 60 counts down to 0, the monitoring timer 60 may determine the running failure of the application processor 40, and in such case, the monitoring timer 60 may send a signal to switch off the first driving circuit 10 and the second driving circuit 50 to turn off the structured light projector 200.

In an example, the monitoring timer 60 may be arranged outside the application processor 40, the monitoring timer 60 may be an external timer chip, the monitoring timer 60 may be connected with an Input/Output (I/O) pin of the application processor 40 to receive the predetermined signal sent by the application processor 40, and the working reliability of the external monitoring timer 60 is relatively high. In another example, the monitoring timer 60 may be integrated into the application processor 40, and a function of the monitoring timer 60 may be realized by an internal timer in the application processor 40, so that a hardware circuit of the control system 100 may be simplified.

Figure 6:
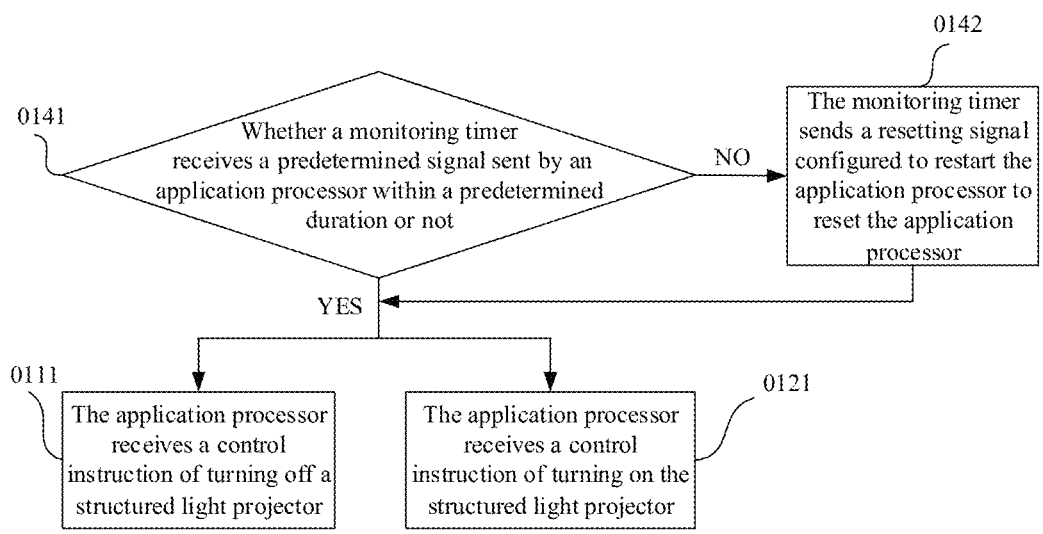

Furthermore, referring to FIG. 2 and FIG. 6, in some implementation modes, the monitoring timer 60 may be further configured to, when the predetermined signal is not received within the predetermined duration, send a resetting signal configured to restart the application processor 40. As described above, if the application processor 40 has failed when the monitoring timer 60 does not receive the predetermined signal within the predetermined duration, in such case, the application processor 40 may not normally provide the enabling signal for the microprocessor 30, the first driving circuit 10, the infrared camera 300, the visible light camera 400 and the like, may not control the detection circuit 20 to detect the output current of the first driving circuit 10 and may further not detect successful turning-on or turning-off of the structured light projector 200 and the like. Then, the monitoring timer 60 may transmit the resetting signal to reset the application processor 40 for normal work.

Specifically, in an example, the resetting signal may be directly received by the application processor 40. The resetting signal has a relatively high priority in an executive program of the application processor 40. The application processor 40 may preferentially respond to the resetting signal and get reset. In another example, the resetting signal may also be sent to an external resetting chip of the application processor 40, and the resetting chip, after responding to the resetting signal, may forcibly reset the application processor 40.

In some implementation modes, the predetermined duration is [50, 150] milliseconds. Specifically, the predetermined duration may be set to be 50 milliseconds, 62 milliseconds, 75 milliseconds, 97 milliseconds, 125 milliseconds, 150 milliseconds and any duration in this interval. It can be understood that, if the predetermined duration is set to be too short, the application processor 40 may be required to send the predetermined signal frequently, resulting in a processing space of the application processor 40 being excessively occupied and thereby making the electronic device 1000 unlikely to run fluently. If the predetermined duration is set to be too long, the failure of the application processor 40 may not be timely detected, which may bring a problem that the structured light projector 200 may not be timely turned off, is unfavorable for safe use of the structured light projector 200 and may also bring a problem that whether the structured light projector 200 is successfully turned on or turned off may not be timely monitored. Setting the predetermined duration to be [50, 150] milliseconds may achieve relatively high compatibility between fluency and safety of the electronic device 1000.

Referring to FIG. 2 and FIG. 3, the application also may provide a control method for the structured light projector 200. Here, the detection signal is an output current. The control method may include the following steps.

In Step 0111, the application processor 40 may receive a control instruction of turning on the structured light projector 200.

In Step 0112, the application processor 40 may provide an enabling signal for the first driving circuit 10 and transmit an instruction of controlling the microprocessor 30 to provide a driving signal for the first driving circuit 10.

In Step 0113, the application processor 40 may control the detection circuit 20 to detect the output current of the first driving circuit 10.

In Step 0114, the application processor 40 may determine whether the output current is within the preset range or not.

In Step 0115, when the output current is within the preset range, the application processor 40 may send a resetting signal to the microprocessor 30 to reset the microprocessor 30.

In Step 0116, the application processor 40 may transmit an instruction of controlling the microprocessor 30 to provide the driving signal for the first driving circuit 10 to enable the microprocessor 30 to provide the driving signal for the first driving circuit 10, and the structured light projector 200 may be successfully turned on.

In Step 0117, when the output current is not within the preset range, the structured light projector 200 may be successfully turned on.

Referring to FIG. 2 and FIG. 4, the control method of the implementation modes of the application may further include the following steps.

In Step 0121, the application processor 40 may receive the control instruction of turning off the structured light projector 200.

In Step 0122, the application processor 40 may keep providing the enabling signal for the first driving circuit 10 and transmit the instruction of controlling the microprocessor 30 to stop providing the driving signal for the first driving circuit 10.

In Step 0123, the application processor 40 may control the detection circuit 20 to detect the output current of the first driving circuit 10.

In Step 0124, the application processor 40 may determine whether the output current is within the preset range or not.

In Step 0125, when the output current is not within the preset range, the application processor 40 may send the resetting signal to the microprocessor 30 to reset the microprocessor 30.

In Step 0126, the application processor 40 may transmit the instruction of controlling the microprocessor 30 to stop providing the driving signal for the first driving circuit 10 to enable the microprocessor 30 to stop providing the driving signal for the first driving circuit 10, and the structured light projector 200 may be successfully turned off.

In Step 0127, when the output current is within the preset range, the structured light projector 200 may be successfully turned off.

Here, Step 0121 to Step 0127 may be implemented before Step 0111. For example, Step 0121 to Step 0127 are executed after the structured light projector 200 is turned off and Step 0111 to Step 0117 are executed after the structured light projector 200 is turned on next time. Step 0121 may also be implemented after Step 0117. For example, Step 0111 to Step 0117 are executed after the structured light projector 200 is turned on and Step 0121 to Step 0127 are executed after the structured light projector 200 is turned off this time.

Referring to FIG. 2 and FIG. 5, the control method of the implementation modes of the application may further include the following steps.

In Step 0121, the application processor 40 may receive the control instruction of turning off the structured light projector 200.

In Step 0128, the application processor 40 may stop providing the enabling signal for the first driving circuit 10.

In Step 0129, the structured light projector 200 may be successfully turned off. Here, two different turning-off manners are adopted for the structured light projector 200 in the implementation mode formed by Step 0121, Step 0128 and Step 0129 and the implementation mode formed by Step 0121 to Step 0127. When the operation of turning off the structured light projector 200 is executed, any one of the two turning-off manners may be selected to turn off the structured light projector 200.

Referring to FIG. 2 and FIG. 5, the control method of the implementation modes of the application may further include the following steps.

In Step 0131, the application processor 40 may receive the control instruction of turning on the structured light projector 200.

In Step 0132, the application processor 40 may provide the enabling signal for the first driving circuit 10.

In Step 0133, the application processor 40 may control the detection circuit 20 to detect the output current of the first driving circuit 10.

In Step 0134, the application processor 40 may determine whether the output current is within the preset range or not.

In Step 0135, when the output current is within the preset range, the application processor 40 may transmit the instruction of providing the driving signal for the first driving circuit 10 to the microprocessor 30, and the structured light projector 200 is turned on.

In Step 0136, the application processor 40 may send the resetting signal to the microprocessor 30 to reset the microprocessor 30, and the structured light projector 200 is turned on.

Here, Step 0131 to Step 0136 may be implemented before Step 0129. A difference between the implementation mode formed by Step 0131 to Step 0136 and the implementation mode formed by Step 0111 to Step 0117 is that the implementation mode formed by Step 0131 to Step 0136 includes operations executed before the structured light projector 200 is turned on (the application processor 40 is going to turn on the structured light projector 200 but has yet not controlled the microprocessor 30 to provide the driving signal for the first driving circuit 10), while the implementation mode formed by Step 0111 to Step 0117 includes operations executed after the structured light projector 200 is turned on (the application processor 40 turns on the structured light projector 200 and controls the microprocessor 30 to provide the driving signal for the first driving circuit 10).

Referring to FIG. 2 and FIG. 6, the control method of the implementation modes of the application may further include the following steps.

In Step 0141, whether the monitoring timer 60 receives the predetermined signal sent by the application processor 40 within the predetermined duration or not may be determined.

In Step 0142, when the monitoring timer 60 does not receive the predetermined signal within the predetermined duration, the monitoring timer 60 may send the resetting signal configured to restart the application processor 40 to reset the application processor 40.

When the monitoring timer 60 does not receive the predetermined signal within the predetermined duration, Step 0111 or Step 0121 may be executed.

Figure 7:
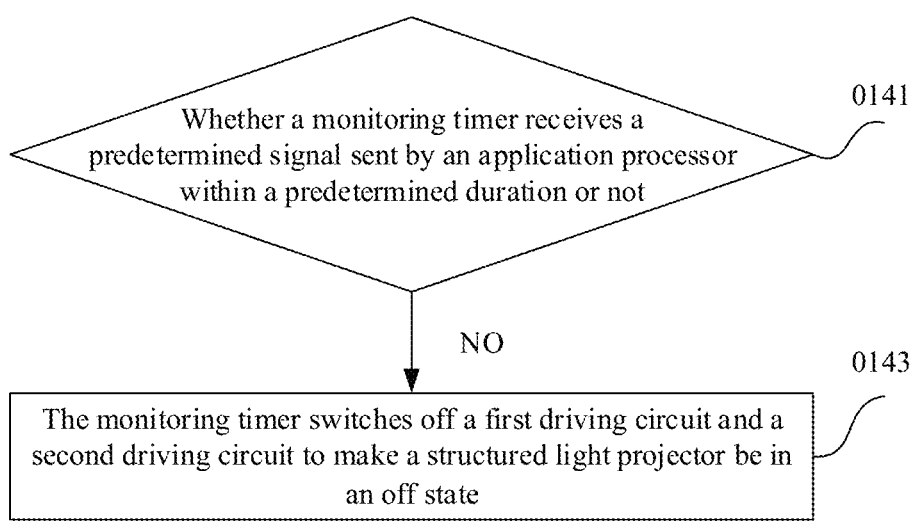

Referring to FIG. 2 and FIG. 7, the control method of the implementation modes of the application may further include the following steps.

In Step 0141, whether the monitoring timer 60 receives the predetermined signal sent by the application processor 40 within the predetermined duration or not may be determined.

In Step 0143, when the monitoring timer 60 does not receive the predetermined signal within the predetermined duration, the monitoring timer 60 may switch off the first driving circuit 10 and the second driving circuit 50 to make the structured light projector 200 in an off state.

Here, Step 0142 and Step 0143 may be synchronously executed, or, Step 0142 may be executed before Step 0143, or Step 0143 may be executed before Step 0142.

Referring to FIG. 8, when the detection signal is the data stream, the control system 100 may include the first driving circuit 10, the microprocessor 30 and the application processor 40.

The first driving circuit 10 may be connected with the structured light projector 200. The first driving circuit 10 may be configured to drive the structured light projector 200 to project laser. Specifically, the first driving circuit 10 may be used as the current source of the structured light projector 200.

The microprocessor 30 may be connected with the first driving circuit 10. The microprocessor 30 may provide a driving signal for the first driving circuit 10. Specifically, the microprocessor 30 may provide a PWM signal for the first driving circuit 10, and the first driving circuit 10 may provide the driving current for the structured light projector 200 based on the PWM signal to enable the structured light projector 200 to project laser. The microprocessor 30 may regulate the duty ratio of the PWM signal to regulate the light emission duration of the structured light projector 200, and regulate the amplitude of the PWM signal to regulate the light emission power of the structured light projector 200.

The application processor 40 may be connected with both of the microprocessor 30 and the first driving circuit 10. The application processor 40 may transmit an instruction of controlling the structured light projector 200 to be turned on or turned off, controlling the infrared camera 300 to be turned on or turned off and the like to the microprocessor 30. The application processor 40 may further provide an enabling signal for the first driving circuit 10 to power on the first driving circuit 10. In a case that the structured light projector 200 is in an on state, the first driving circuit 10 may be required to simultaneously meet the following two conditions: one is that the application processor 40 has provided the enabling signal for the first driving circuit 10 to make the first driving circuit 10 to work in an on state, and the other is that the microprocessor 30 provides a PWM signal for the first driving circuit to enable the first driving circuit 10 to provide a driving current for the structured light projector 200.

The abnormal software flow may occur when the microprocessor 30 is working. Under this condition, the microprocessor 30 may be not able to provide a driving signal for the first driving circuit 10, and the structured light projector 200 may be not able to be switched from an off state to an on state, namely the structured light projector 200 may not be successfully turned on. Or, the microprocessor 30 may keep providing the driving signal for the first driving circuit 10, and the structured light projector 200 may not be switched from the on state to the off state, namely the structured light projector 200 may not be successfully turned off.

According to the control system 100 of the implementation modes of the application, whether the structured light projector 200 is successfully turned on or not may be detected every time when the structured light projector 200 is turned on, and whether the structured light projector 200 is successfully turned off or not may be detected every time when the structured light projector 200 is turned off.

Specifically, the microprocessor 30 may be connected with the infrared camera 300, and the microprocessor 30 may receive a data stream sent by the infrared camera 300. Here, the data stream may refer to a laser image and an infrared image shot by the infrared camera 300. The infrared image may be an image shot when an infrared floodlight is turned on, and the laser image is an image shot when the structured light projector 200 is turned on. The microprocessor 30 may mark the image shot by the infrared camera 300, and the application processor 40 may distinguish whether the received data stream is the infrared image or the laser image according to a mark. The microprocessor 30 may be further connected with the application processor 40, the microprocessor 30 may send the data stream to the application processor 40, and the application processor 40 may determine whether the structured light projector 200 is successfully turned on or turned off based on a receiving result of the data stream, control the structured light projector 200 to be turned on when the structured light projector 200 is not successfully turned on, and control the structured light projector 200 to be turned off when the structured light projector 200 is not successfully turned off.

The control system 100 may further include the monitoring timer 60. The monitoring timer 60 may be connected with both of the microprocessor 30 and the application processor 40. The monitoring timer 60 may be configured to periodically read a predetermined signal from the microprocessor 30. When the monitoring timer 60 does not read the predetermined signal within a predetermined duration, the monitoring timer 60 may be configured to send a resetting signal configured to restart the microprocessor 30 to restart the microprocessor 30, and the restarted microprocessor 30 may work normally. The monitoring timer 60 may transmit information about a working state of the microprocessor 30 to the application processor 40.

Figure 9:
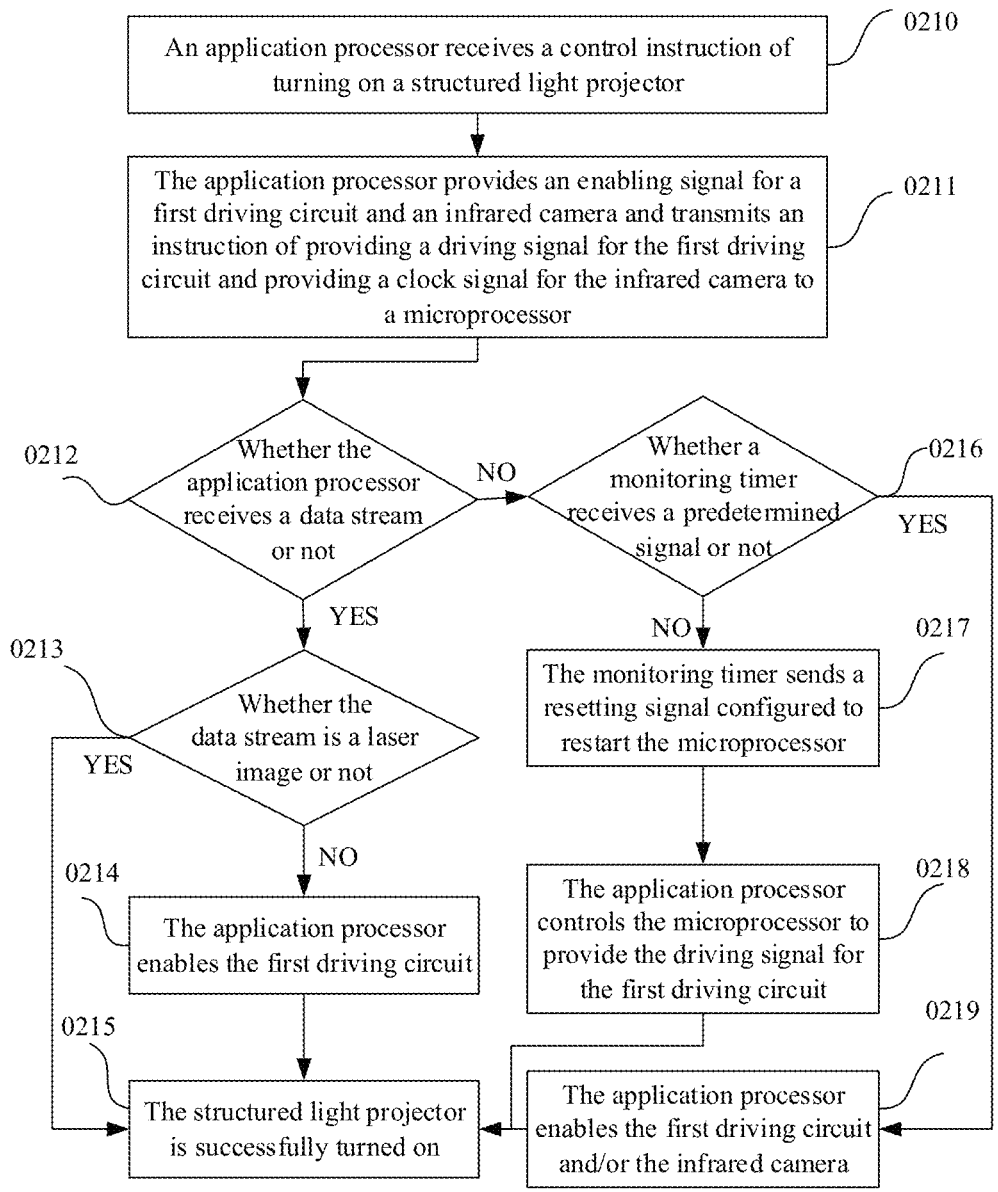
FIG. 9 to FIG. 11 are flowcharts of a control method for a structured light projector of the electronic device in FIG. 8.

In combination with FIG. 8 and FIG. 9, the application processor 40 may receive a control instruction of turning on the structured light projector 200. After the application processor 40 receives the turning-on control instruction, the application processor 40 may provide an enabling signal for the first driving circuit 10 and the infrared camera 300 and transmit an instruction of providing a driving signal for the first driving circuit 10 and providing a clock signal for the infrared camera 300 to the microprocessor 30. After the application processor 40 may provide the enabling signal for both the first driving circuit 10 and the infrared camera 300 and transmit an instruction of providing the driving signal for the first driving circuit 10 and providing the clock signal for the infrared camera 300 to the microprocessor (a corresponding application scenario is that a user is subjectively intended to turn on the structured light projector 200 but is not sure about whether it is successfully turned on or not), the application processor 40 may execute the operation of receiving the data stream sent by the microprocessor 30.

In such case, if the application processor 40 does not receive the data stream and the monitoring timer 60 does not read the predetermined signal, it is indicated that the software flow works abnormally at the microprocessor 30, the microprocessor 30 does not successfully provide the driving signal for the first driving circuit 10 and the structured light projector 200 is not successfully turned on. In such case, the monitoring timer 60 sends a resetting signal to the microprocessor 30, the microprocessor 30, after receiving the resetting signal, is restarted to work in a normal state (or, the monitoring timer 60 sends a resetting signal to the application processor 40 and the application processor 40, after receiving the resetting signal, restarts the microprocessor 30 to enable the microprocessor to work in a normal state), then the application processor 40 may control the microprocessor 30 to provide a driving signal for the first driving circuit 10 and provide a clock signal for the infrared camera 300, and both of the structured light projector 200 and the infrared camera 300 are successfully turned on.

If the application processor 40 does not receive the data stream but the monitoring timer 60 reads the predetermined signal, it is indicated that no software flow works abnormally at the microprocessor 30, the microprocessor 30 may provide the driving signal for the first driving circuit 10 and provide the clock signal for the infrared camera 300. The application processor 40 fails to receive the data stream probably because the application processor 40 does not successfully provide the enabling signal for the first driving circuit 10 and the infrared camera 300. In such case, the application processor 40 may re-enable the first driving circuit 10 and the infrared camera 300 to turn on both of the structured light projector 200 and the infrared camera 300.

If the application processor 40 receives the data stream but the data stream is not the laser image but the infrared image, it is indicated that no software flow works abnormally at the microprocessor 30, the microprocessor 30 may provide the driving signal for the first driving circuit 10 and provide the clock signal for the infrared camera 300. The application processor 40 fails to receive the laser image probably because the application processor 40 does not successfully provide the enabling signal for the first driving circuit 10. In such case, the application processor 40 may re-enable the first driving circuit 10 to turn on both of the structured light projector 200.

If the application processor 40 receives the data stream and the data stream is the laser image, it is indicated that the structured light projector 200 and the infrared camera 300 have been successfully turned on. In such case, the application processor 40 may keep a state of providing the enabling signal for the first driving circuit 10 and the infrared camera 300, and the microprocessor 30 may keep a state of providing the driving signal for the first driving circuit 10 and providing the clock signal for the infrared camera 300.

Figure 10:
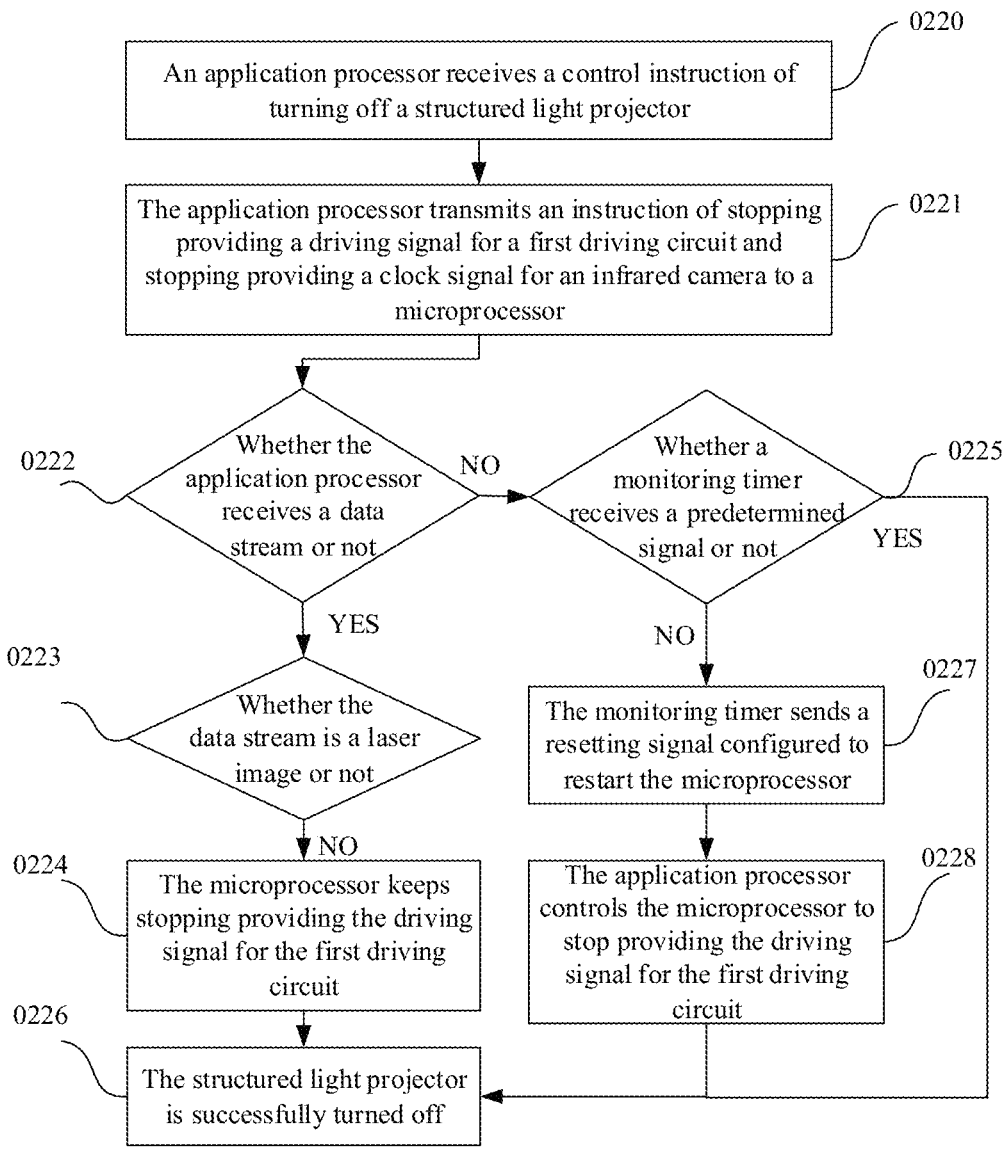

In combination with FIG. 8 and FIG. 10, the application processor 40 may further receive a control instruction of turning off the structured light projector 200. After the application processor 40 receives the turning-off control instruction, the application processor 40 may transmit an instruction of stopping providing the driving signal for the first driving circuit 10 and stopping providing the clock signal for the infrared camera 300 to the microprocessor 30. After the application processor 40 transmits the instruction of stopping providing the driving signal for the first driving circuit 10 and stopping providing the clock signal for the infrared camera 300 to the microprocessor 30 (a corresponding application scenario is that a user is subjectively intended to turn off the structured light projector 200 but is not sure about whether it is successfully turned off or not), the application processor 40 may execute the operation of receiving the data stream sent by the microprocessor 30.

In such case, if the application processor 40 does not receive the data stream and the monitoring timer 60 does not read the predetermined signal, it is indicated that the software flow works abnormally at the microprocessor 30, the microprocessor 30 does not successfully stopping providing the driving signal for the first driving circuit 10 and stopping providing the clock signal for the infrared camera 300 and the structured light projector 200 and the infrared camera 300 are not successfully turned off. In such case, the monitoring timer 60 may send a resetting signal configured to restart the microprocessor 30, the microprocessor 30 may be restarted according to the resetting signal to work in a normal state, then the application processor 40 may control the microprocessor 30 to stop providing the driving signal for the first driving circuit 10, and the structured light projector 200 is successfully turned off.

If the application processor 40 does not receive the data stream but the monitoring timer 60 reads the predetermined signal, it is indicated that the structured light projector 200 has been successfully turned off. The microprocessor 20 may keep the operation of stopping providing the driving signal for the first driving circuit 10.

If the application processor 40 receives the data stream but the data stream is not the laser image but the infrared image, it is indicated that the structured light projector 200 has been successfully turned off. The microprocessor 20 may keep the operation of stopping providing the driving signal for the first driving circuit 10.

After the application processor 40 completes detecting whether the structured light projector 200 is successfully turned off or not and successfully turns off the structured light projector 200, the application processor 40 may stop providing the enabling signal for the first driving circuit 10.

Here, the application processor 40 may detect whether the structured light projector 200 is successfully turned on or not after the structured light projector 200 is turned on and detect whether the structured light projector 200 is successfully turned off or not after the structured light projector 200 is turned off. Or, the application processor 40 may only detect whether the structured light projector 200 is successfully turned on or not after the structured light projector 200 is turned on. Or, the application processor 40 may only detect whether the structured light projector 200 is successfully turned off or not after the structured light projector 200 is turned off.

It is to be noted that the application processor 40 may detect whether the structured light projector 200 is successfully turned on or not after the structured light projector 200 is turned on. Here, turning-on of the structured light projector 200 refers to a cognition of a user, that is, the user considers that the structured light projector 200 is turned on, but the structured light projector 200 is not successfully turned on in fact because of the abnormal software flow of the microprocessor 30 or the application processor 40. Similarly, the application processor 40 may detect whether the structured light projector 200 is successfully turned off or not after the structured light projector 200 is turned off. Here, turning-off of the structured light projector 200 also refers to a cognition of a user, that is, the user considers that the structured light projector 200 is turned off, but the structured light projector 200 is not successfully turned off in fact because of the abnormal software flow of the microprocessor 30.

From the above, according to the control system 100 of the implementation modes of the application, the application processor 40 may determine whether the structured light projector 200 is successfully turned on or turned off based on the receiving result of the data stream output by the infrared camera 300 and control the first driving circuit 10 to be turned on and turned off based on the data stream, thereby avoiding the problem that a user experience is influenced by the fact that the structured light projector 200 is not successfully turned on or turned off because of the abnormal software flow occurring to the microprocessor 30.

Figure 11:
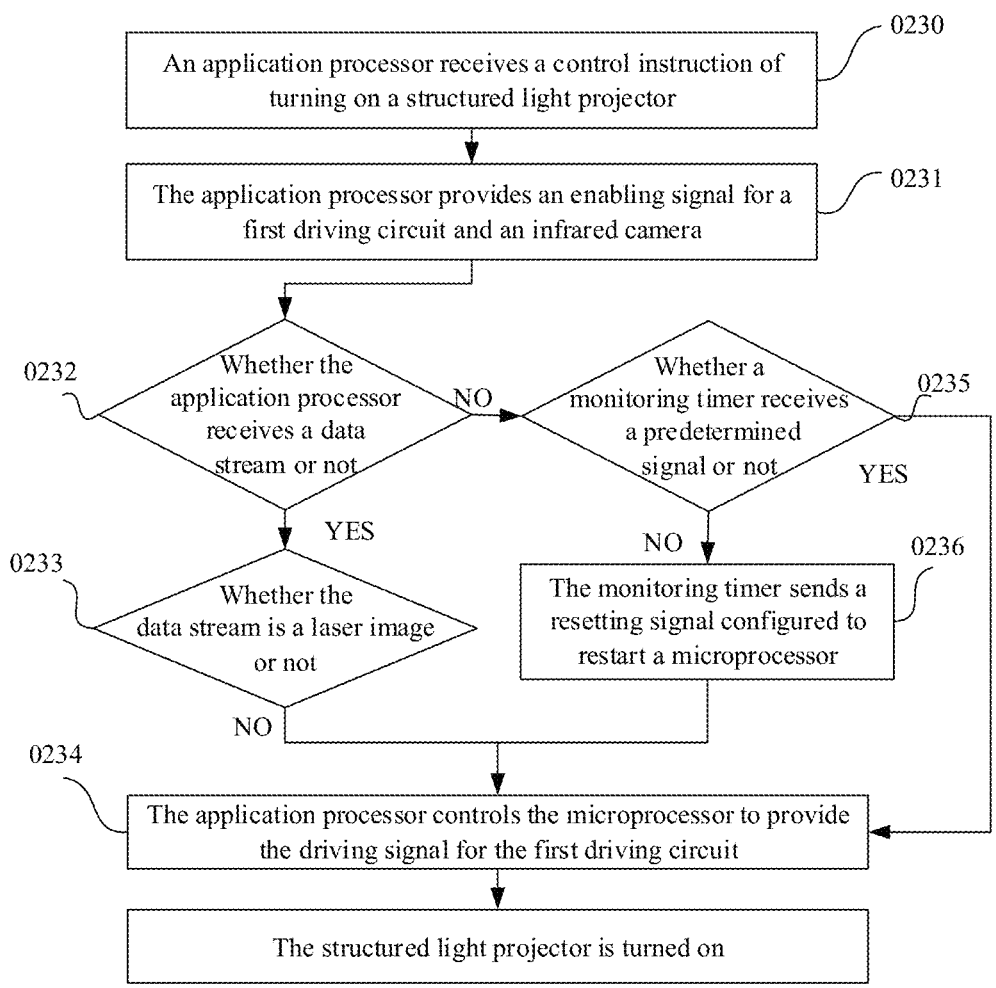

In combination with FIG. 8 and FIG. 11, in some implementation modes, the application processor 40 may detect the working state of the structured light projector 200 when receiving the control instruction for turning on the structured light projector 200, namely detecting the structured light projector 200 before the structured light projector 200 is turned on. Specifically, after the application processor 40 receives the control instruction for turning on the structured light projector 200, the application processor 40 may provide the enabling signal for the first driving circuit 10 and the infrared camera 300 at first. Then, the application processor 40 executes the operation of receiving the data stream.

In such case, if the application processor 40 does not receive the data stream and the monitoring timer 60 does not read the predetermined signal, it is indicated that the software flow works abnormally at the microprocessor 40 and, even though the application processor 40 transmits an instruction of providing a driving signal for the first driving circuit 10 and providing a clock signal for the infrared camera 300 to the microprocessor 30, the microprocessor 30 cannot execute the instruction. In addition, since the there is some wrong with the microprocessor 30, the microprocessor 30 may have provided a driving signal for the first driving circuit 10 and provided a clock signal for the infrared camera, the application processor 40 may provide an enabling signal for the first driving circuit 10 and the infrared camera 300, and the structured light projector 200 is in the on state. The microprocessor 30 may also have yet not provided the driving signal for the first driving circuit 10 and provided the clock signal for the infrared camera, and the structured light projector 200 is in the off state. No matter which state the structured light projector 200 is in, the monitoring timer 60 may send a resetting signal. The microprocessor 30 may be restarted according to the resetting signal to work in a normal state, then the application processor 40 may control the microprocessor 30 to provide the driving signal for the first driving circuit 10 and provide the clock signal for the infrared camera 300, and both of the structured light projector 200 and the infrared camera 300 may be successfully turned on.

If the application processor 40 does not receive the data stream but the monitoring timer 60 reads the predetermined signal, it is indicated that no software flow works abnormally at the microprocessor 30 and the structured light projector 200 is in the normal off state. In such case, the application processor 40 may transmit the instruction of providing the driving signal for the first driving circuit 10 and providing the clock signal for the infrared camera 300 to the microprocessor 20 to turn on the structured light projector 200 and the infrared camera 300.

If the application processor 40 receives the data stream and the data stream is not the laser image but the infrared image, it is indicated that no software flow works abnormally at the microprocessor 30 and the structured light projector 200 is in the normal off state. In such case, the application processor 40 may transmit the instruction of providing the driving signal for the first driving circuit 10 to the microprocessor 30 to turn on the structured light projector 200.

In some implementation modes, the monitoring timer 60 may be a counter. After the monitoring timer 60 receives a predetermined signal, the monitoring timer 60 may start counting down from a number at a certain speed. If the microprocessor 30 works normally, before countdown to 0, the microprocessor 30 may send the predetermined signal again, and the monitoring timer 60, after receiving the predetermined signal, resets a countdown. If the microprocessor 30 does not work normally, when the monitoring timer 60 counts down to 0, the monitoring timer 60 determines a running failure of the microprocessor 30, and in such case, the monitoring timer 60 may send the resetting signal to reset the microprocessor 30 for normal work.

In some implementation modes, the monitoring timer 60 may be further configured to periodically read a preset signal from the application processor 40. When the monitoring timer 60 does not read the preset signal within a preset duration, the monitoring timer 60 may send a resetting signal configured to restart the application processor 40 to the application processor 40 so as to restart the application processor 40, and the restarted application processor 40 may work normally.

Furthermore, the control system 100 may further include the second driving circuit 50. The second driving circuit 50 may be connected with the first driving circuit 10, and the second driving circuit 50 may supply power to the first driving circuit 10. The monitoring timer 60 may be connected with the first driving circuit 10 and the second driving circuit 50. When the monitoring timer 60 does not receive the preset signal sent by the application processor 40 within the preset duration, the first driving circuit 10 and the second driving circuit 50 may be switched off to turn off the structured light projector 200. Therefore, the monitoring timer 60 may also control the structured light projector 200 to be turned off to solve the problem that the eyes of a user may be harmed due to the fact that, in a process of turning on the structured light projector 200, the application processor 40 goes down and the structured light projector 200 is kept on.

The predetermined duration and the preset duration may be set before delivery of the electronic device 1000, or may also be self-defined in the electronic device 1000 by a user. The predetermined duration may be equal or unequal to the preset duration.

In an example, the monitoring timer 60 may be arranged outside the application processor 40, the monitoring timer 60 may be an external timer chip, and the monitoring timer 60 may be connected with the I/O pin of the application processor 40 to receive a preset signal sent by the application processor 40, and may be connected with an I/O pin of the microprocessor 30 to receive a predetermined signal sent by the microprocessor 30. The external monitoring timer 60 has a high working reliability. In another example, the monitoring timer 60 may be integrated into the application processor 40, and the function of the monitoring timer 60 may be realized by the internal timer of the application processor 40, so that the hardware circuit of the control system 100 may be simplified.

Referring to FIG. 8 and FIG. 9, the application also may provide a control method for the structured light projector 200. Here, the detection signal is a data stream. The control method may include the following steps.

In Step 0210, the application processor 40 may receive a control instruction of turning on the structured light projector 200.

In Step 0211, the application processor 40 may provide an enabling signal for the first driving circuit 10 and the infrared camera 300 and transmit an instruction of providing a driving signal for the first driving circuit 10 and providing a clock signal for the infrared camera 300 to the microprocessor 30.

In Step 0212, the application processor 40 may determine whether a data stream is received or not.

In Step 0213, when the application processor 40 may receive the data stream, the application processor 40 may determine whether the data stream is a laser image or not.

In Step 0214, when the data stream is not a laser image, the application processor 40 may enable the first driving circuit 10, and the structured light projector 200 may be successfully turned on.

In Step 0215, when the data stream is the laser image, the structured light projector 200 may be successfully turned on.

In Step 0216, when the application processor 40 does not receive the data stream, the monitoring timer 60 may determine whether the predetermined signal sent by the microprocessor 30 is received or not.

In Step 0219, when the monitoring timer 60 receives the predetermined signal, the application processor 40 may enable the first driving circuit 10 and/or the infrared camera 300, and the structured light projector 200 may be successfully turned on.

In Step 0217, when the monitoring timer 60 does not receive the predetermined signal, the monitoring timer 60 may send a resetting signal configured to restart the microprocessor 30.

In Step 0218, after the microprocessor 30 is restarted, the application processor 40 may control the microprocessor 30 to provide the driving signal for the first driving circuit 10, and the structured light projector 200 is successfully turned on.

Referring to FIG. 8 and FIG. 10, the control method of the implementation modes of the application may further include the following steps.

In Step 0220, the application processor 40 may receive a control instruction of turning off the structured light projector 200.

In Step 0221, the application processor 40 may transmit an instruction of stopping providing the driving signal for the first driving circuit 10 and stopping providing the clock signal for the infrared camera 300 to the microprocessor 30.

In Step 0222, the application processor 40 may determine whether a data stream is received or not.

In Step 0223, when the application processor 40 receives the data stream, the application processor 40 may determine whether the data stream is a laser image or not.

In Step 0224, when the data stream is not the laser image, the microprocessor 30 may keep stopping providing the driving signal for the first driving circuit 10, and the structured light projector 200 is successfully turned off.

In Step 0225, when the application processor 40 does not receive the data stream, the monitoring timer 60 may determine whether the predetermined signal sent by the microprocessor 30 is received or not.

In Step 0226, when the monitoring timer 60 receives the predetermined signal, the structured light projector 200 is successfully turned off.

In Step 0227, when the monitoring timer 60 does not receive the predetermined signal, the monitoring timer 60 may send a resetting signal configured to restart the microprocessor 30.

In Step 0228, after the microprocessor 30 is restarted, the application processor 40 may control the microprocessor 30 to stop providing the driving signal for the first driving circuit 10, and the structured light projector 200 is successfully turned off.

Here, Step 0220 to Step 0228 may be implemented before Step 0210. For example, Step 0220 to Step 0228 are executed after the structured light projector 200 is turned off and Step 0210 to Step 0219 are executed after the structured light projector 200 is turned on next time. Step 0220 to Step 0228 may also be implemented after Step 0215. For example, Step 0210 to Step 0219 are executed after the structured light projector 200 is turned on and Step 0220 to Step 0228 are executed after the structured light projector 200 is turned off this time.

Referring to FIG. 8 and FIG. 11, the control method of the implementation modes of the application may further include the following steps.

In Step 0230, the application processor 40 may receive a control instruction of turning on the structured light projector 200.

In Step 0231, the application processor 40 may provide an enabling signal for the first driving circuit 10 and the infrared camera 300.

In Step 0232, the application processor 40 may determine whether a data stream is received or not.

In Step 0233, when the application processor 40 receives the data stream, the application processor 40 may determine whether the data stream is a laser image or not.

In Step 0234, when the data stream is not a laser image, the application processor 40 may control the microprocessor 30 to provide a driving signal for the first driving circuit 10, and the structured light projector 200 is successfully turned on.

In Step 0235, when the application processor 40 does not receive the data stream, the monitoring timer 60 may determine whether the predetermined signal sent by the microprocessor 30 is received or not.

In Step 0236, when the monitoring timer 60 does not receive the predetermined signal, the monitoring timer 60 may send a resetting signal configured to restart the microprocessor 30, and after the microprocessor 30 is restarted, Step 0234 is executed to turn on the structured light projector 200.

Step 0234 is executed to turn on the structured light projector 200 when the monitoring timer 60 receives the predetermined signal.

Step 0230 to Step 0236 may be executed before Step 0226. A difference between the implementation mode formed by Step 0230 to Step 0236 and the implementation mode formed by Step 0210 to Step 0219 is that the implementation mode formed by Step 0230 to Step 0236 includes operations executed before the structured light projector 200 is turned on (the application processor 40 is going to turn on the structured light projector 200 but has yet not controlled the microprocessor 30 to provide a driving signal for the first driving circuit 10) and is mainly adopted to determine whether the structured light projector 200 has been turned on before the structured light projector is turned on or not, while the implementation mode formed by Step 0210 to Step 0219 includes operations executed after the structured light projector 200 is turned on (the application processor 40 turns on the structured light projector 200 and controls the microprocessor 30 to provide a driving signal for the first driving circuit 10) is mainly adopted to determine whether the structured light projector 200 is successfully turned on after the structured light projector 200 is turned on.

In the descriptions of the specification, the descriptions made with reference to terms "an embodiment", "some embodiments", "example", "specific example", "some examples" or the like refer to that specific features, structures, materials or characteristics described in combination with the embodiment or the example are included in at least one embodiment or example of the application. In the specification, these terms are not always schematically expressed for the same embodiment or example. Moreover, the specific described features, structures, materials or characteristics may be combined properly in any one or more embodiments or examples. In addition, those skilled in the art may integrate and combine different embodiments or examples described in the specification and features of different embodiments or examples without conflicts.

In addition, terms "first" and "second" are only adopted for description but should not be understood to indicate or imply relative importance or implicitly indicate the amount of indicated technical features. Therefore, features defined by "first" and "second" may explicitly or implicitly indicate inclusion of at least one such feature. In the descriptions of the application, "multiple" means at least two, for example, two and three, unless otherwise limited definitely and specifically.

Any process or method in the flowcharts or described herein in another manner may be understood to represent a module, segment or part including codes of one or more executable instructions configured to realize specific logic functions or steps of the process and, moreover, the scope of the preferred implementation mode of the application includes other implementation, not in a sequence shown or discussed herein, including execution of the functions basically simultaneously or in an opposite sequence according to the involved functions. This should be understood by those skilled in the art of the embodiments of the application.

Logics and/or steps represented in the flowcharts or described herein in another manner, which for example, may be considered as a fixed sequence list of executable instructions configured to realize the logic functions, may specifically implemented in any computer-readable medium for an instruction execution system, device or equipment (for example, a computer-based system, a system including a processor or another system capable of reading instructions from the instruction execution system, device or equipment and executing the instructions) to use or for use in combination with the instruction execution system, device or equipment. For the specification, "computer-readable medium" may be any device capable of including, storing, communicating with, propagating or transmitting a program for the instruction execution system, device or equipment to use or for use in combination with the instruction execution system, device or equipment. A more specific example (non-exhaustive list) of the computer-readable medium may include: an electric connection portion (electronic device) with one or more wires, a portable computer disk (magnetic device), a Random Access Memory (RAM), a Read-Only Memory (ROM), an Erasable Programmable ROM (EPROM) (or flash memory), an optical fiber device and a portable Compact Disc Read-Only Memory (CD-ROM). In addition, the computer-readable medium may even be paper or other medium on which the program may be printed because, for example, the paper or other medium may be optically scanned then edited, explained or, when necessary, processed in other proper manner to obtain the program in an electronic manner for storage in the computer memory.

It should be understood that each part of the application may be implemented by hardware, software, firmware or any combination thereof. In the abovementioned implementation modes, multiple steps or methods may be implemented by software or firmware stored in a memory and executed by a proper instruction execution system. For example, in case of implementation with hardware, as similar in other implementation mode, any one or combination of the following technologies well-known in the art may be adopted for implementation: a discrete logic circuit with a logic gate circuit configured to realize a logic function for a data signal, an application-specific integrated circuit with a proper combined logic gate circuit, a Programmable Gate Array (PGA), a Field Programmable Gate Array (FPGA) and the like.

Those of ordinary skill in the art should understand that all or part of the steps in the method of the abovementioned embodiment may be completed through related hardware instructed by a program, the program may be stored in a computer-readable storage medium, and when the program is executed, one or combination of the steps of the method embodiment is included.

In addition, each functional unit in each embodiment of the application may be integrated into a processing module, each unit may also physically exist independently, and two or more than two units may also be integrated into a module. The integrated module may be implemented by hardware or software functional module(s). When being implemented in form of software functional module and sold or used as an independent product, the integrated module may be stored in a computer-readable storage medium.

The storage medium may be a ROM, a magnetic disk, an optical disk or the like. The embodiments of the application have been shown or described above. However, it can be understood that the abovementioned embodiments are exemplary and should not be understood as limits to the application and those of ordinary skill in the art may make variations, modifications, replacements, transformations to the abovementioned embodiments within the scope of the application.

The invention claimed is:

1. A control system for a structured light projector, comprising:
    a first driving circuit, connected with the structured light projector and configured to drive the structured light projector to project laser;
    a microprocessor, connected with the first driving circuit and configured to provide a driving signal for the first driving circuit; and
    an application processor, connected with the microprocessor and the first driving circuit, and configured to:
        receive a control instruction of turning on or turning off the structured light projector;
        provide an enabling signal for the first driving circuit;
        transmit an instruction of controlling the microprocessor to provide the driving signal for the first driving circuit in response to that the control instruction of turning on the structured light projector is received, or transmit an instruction of controlling the microprocessor to stop providing the driving signal for the first driving circuit in response to that the control instruction of turning off the structured light projector is received;
        receive a detection signal, wherein the detection signal is an output current of the first driving circuit or is an image sent by the microprocessor;
        restart the microprocessor or not based on the detection signal; and
        control the structured light projector to be turned on or turned off.

2. The control system of claim 1, further comprising a detection circuit,
    wherein the detection circuit is connected with the first driving circuit to detect the output current of the first driving circuit; and
    the application processor is connected with the detection circuit, and the application processor is configured to control the first driving circuit to be switched on or switched off based on the output current.

3. The control system of claim 2, wherein
after the application processor controls the microprocessor to provide the driving signal for the first driving circuit, the application processor is configured to control the detection circuit to detect the output current;
responsive to that the output current is within a preset range, the application processor is configured to reset the microprocessor and control the microprocessor to provide the driving signal for the first driving circuit; and
responsive to that the output current is not within the preset range, the microprocessor is configured to keep providing the driving signal for the first driving circuit.

4. The control system of claim 3, further comprising:
a second driving circuit, connected with the first driving circuit and configured to supply power to the first driving circuit; and
a monitoring timer, connected with the first driving circuit, the second driving circuit and the application processor,
wherein the monitoring timer is configured to receive a predetermined signal sent by the application processor, and configured to, when the predetermined signal is not received within a predetermined duration, switch off the first driving circuit and the second driving circuit to make the structured light projector be in an off state.

5. The control system of claim 4, wherein the monitoring timer is further configured to, when the predetermined signal is not received within the predetermined duration, send a resetting signal configured to restart the application processor.

6. The control system of claim 4, wherein the monitoring timer is integrated into the application processor, or the monitoring timer is connected outside the application processor.

7. The control system of claim 2, wherein
after the application processor controls the microprocessor to stop providing the driving signal for the first driving circuit, the application processor is configured to control the detection circuit to detect the output current;
responsive to that the output current is within a preset range, the microprocessor is configured to keep stopping providing the driving signal for the first driving circuit; and
responsive to that the output current is not within the preset range, the application processor is configured to reset the microprocessor and control the microprocessor to stop providing the driving signal for the first driving circuit.

8. The control system of claim 2, wherein after the application processor receives the control instruction for turning on the structured light projector again, the application processor is configured to control the detection circuit to detect the output current;
responsive to that the output current is within a preset range, the application processor is configured to control the microprocessor to provide the driving signal for the first driving circuit; and
responsive to that the output current is not within the preset range, the application processor is configured to reset the microprocessor and control the microprocessor to provide the driving signal for the first driving circuit.

9. The control system of claim 1,
wherein the microprocessor is further connected with an infrared camera to receive the image sent by the infrared camera; and
the application processor is configured to determine whether the image sent by the microprocessor is received or not and control the first driving circuit to be switched on or switched off based on a receiving result of the image.

10. The control system of claim 9, further comprising a monitoring timer,
wherein the monitoring timer is connected with both of the microprocessor and the application processor, the monitoring timer is configured to periodically read a predetermined signal from the microprocessor, and when the monitoring timer does not read the predetermined signal, the monitoring timer is configured to send a resetting signal configured to restart the microprocessor;
after the application processor controls the microprocessor to provide the driving signal for the first driving circuit and provide a clock signal for the infrared camera, responsive to that the application processor does not receive the image and that the monitoring timer does not read the predetermined signal, the monitoring timer is configured to send the resetting signal configured to restart the microprocessor, and after the microprocessor is reset, the application processor is configured to control the microprocessor to provide the driving signal for the first driving circuit; and
after the application processor controls the microprocessor to provide the driving signal for the first driving circuit and provide the clock signal for the infrared camera, responsive to that the application processor does not receive the image and that the monitoring timer reads the predetermined signal, the application processor is configured to enable at least one of the first driving circuit or the infrared camera.

11. The control system of claim 10, wherein the image comprises an infrared image and a laser image;
responsive to that the application processor receives the image and the image is the infrared image, the application processor is configured to enable the first driving circuit; and
responsive to that the application processor receives the image and the image is the laser image, the microprocessor is configured to keep providing the driving signal for the first driving circuit.

12. The control system of claim 9, further comprising a monitoring timer,
wherein the monitoring timer is connected with both of the microprocessor and the application processor, the monitoring timer is configured to periodically read a predetermined signal from the microprocessor, and when the monitoring timer does not read the predetermined signal, the monitoring timer is configured to send a resetting signal configured to restart the microprocessor;
after the application processor controls the microprocessor to stop providing the driving signal for the first driving circuit and stop providing a clock signal for the infrared camera, responsive to that the application processor does not receive the image and the monitoring timer does not read the predetermined signal, the monitoring timer is configured to send the resetting signal configured to restart the microprocessor, and after the microprocessor is reset, the application processor is configured to control the microprocessor to stop providing the driving signal for the first driving circuit; and after the application processor controls the microprocessor to stop providing the driving signal for the first driving circuit and stop providing the clock signal for the infrared camera, responsive to that the application processor does not receive the image and that the monitoring timer reads the predetermined signal, the microprocessor is configured to keep stopping providing the driving signal for the first driving circuit.

13. The control system of claim 12, wherein the image comprises an infrared image and a laser image; and responsive to that the application processor receives the image and the image is the infrared image, the microprocessor is configured to keep stopping providing the driving signal for the first driving circuit.

14. The control system of claim 9, further comprising a monitoring timer, wherein the monitoring timer is connected with both of the microprocessor and the application processor, the monitoring timer is configured to periodically read a predetermined signal from the microprocessor, and when the monitoring timer does not read the predetermined signal, the monitoring timer is configured to send a resetting signal configured to restart the microprocessor;

when the application processor receives a control instruction of turning on both the structured light projector and the infrared camera, responsive to that the application processor does not receive the image and that the monitoring timer reads the predetermined signal, the application processor is configured to control the microprocessor to provide the driving signal for the first driving circuit; and responsive to that the application processor does not receive the image and that the monitoring timer does not read the predetermined signal, the monitoring timer is configured to send the resetting signal configured to restart the microprocessor, and after the microprocessor is reset, the application processor is configured to control the microprocessor to provide the driving signal for the first driving circuit.

15. The control system of claim 14, wherein the image comprises an infrared image and a laser image; and responsive to that the application processor receives the image and the image is the infrared image, the application processor is configured to control the microprocessor to provide the driving signal for the first driving circuit.

16. An electronic device, comprising:
a structured light projector; and
a control system comprising:
a first driving circuit, connected with the structured light projector and configured to drive the structured light projector to project laser;
a microprocessor, connected with the first driving circuit and configured to provide a driving signal for the first driving circuit; and
an application processor, connected with the microprocessor and the first driving circuit, and configured to:

receive a control instruction of turning on or turning off the structured light projector;

provide an enabling signal for the first driving circuit;

transmit an instruction of controlling the microprocessor to provide the driving signal for the first driving circuit in response to that the control instruction of turning on the structured light projector is received, or transmit an instruction of controlling the microprocessor to stop providing the driving signal for the first driving circuit in response to that the control instruction of turning off the structured light projector is received;

receive a detection signal, wherein the detection signal is an output current of the first driving circuit or is an image sent by the microprocessor;

restart the microprocessor or not based on the detection signal; and control the structured light projector to be turned on or turned off.

17. The electronic device of claim 16, wherein the structured light projector is capable of projecting laser to a target object, the electronic device further comprises an infrared camera, the infrared camera being capable of receiving a laser pattern modulated by the target object, and the microprocessor is configured to process the laser pattern and a reference image stored in the microprocessor to obtain a depth image.

18. The electronic device of claim 17, wherein the application processor is configured to have a trusted execution environment, and the microprocessor is configured to transmit the depth image into the trusted execution environment of the application processor for storage.

19. The electronic device of claim 16, wherein the structured light projector is capable of projecting laser to a target object, the electronic device further comprises an infrared camera, the infrared camera being capable of receiving a laser pattern modulated by the target object, a microprocessor is configured to transmit a reference image stored in a trusted execution environment of the microprocessor and the laser pattern to a trusted execution environment of the application processor, and the application processor is configured to process the laser pattern and the reference image to obtain the depth image.

20. The electronic device of claim 16, wherein the structured light projector is capable of projecting laser to a target object, the electronic device further comprises an infrared camera, the infrared camera being capable of receiving a laser pattern modulated by the target object, a microprocessor is configured to transmit the laser pattern to a trusted execution environment of the application processor, and the application processor is configured to process an reference image stored in the trusted execution environment of the application processor and the laser pattern to obtain the depth image.

* * * * *